(12) United States Patent
Fahr et al.

(10) Patent No.: US 10,036,869 B2
(45) Date of Patent: Jul. 31, 2018

(54) MONOLITHIC LENS MOUNT

(71) Applicant: JENOPTIK Optical Systems GmbH, Jena (DE)

(72) Inventors: Stephan Fahr, Jena (DE); Torsten Erbe, Jena (DE); Matthias Bening, Jena (DE); Christian Dehmel, Laasdorf (DE)

(73) Assignee: JENOPTIK Optical Systems GmbH, Jena (DE)

( * ) Notice: Subject to any disclaimer, the term of this patent is extended or adjusted under 35 U.S.C. 154(b) by 0 days.

(21) Appl. No.: 15/271,716

(22) Filed: Sep. 21, 2016

(65) Prior Publication Data

US 2017/0082826 A1    Mar. 23, 2017

(30) Foreign Application Priority Data

Sep. 21, 2015  (DE) .................. 10 2015 115 929

(51) Int. Cl.
*G02B 7/02*   (2006.01)

(52) U.S. Cl.
CPC .................. *G02B 7/026* (2013.01)

(58) Field of Classification Search
CPC . G02B 7/023; G02B 7/00; G02B 7/02; G02B 7/026; G03F 7/70825
USPC ............................... 359/819–830
See application file for complete search history.

(56) References Cited

U.S. PATENT DOCUMENTS

| | | | |
|---|---|---|---|
| 4,733,945 A | 3/1988 | Bacich | |
| 5,353,166 A | 10/1994 | Hanford et al. | |
| 5,488,514 A | 1/1996 | Bruning et al. | |
| 6,229,657 B1 | 5/2001 | Holderer et al. | |
| 6,259,571 B1* | 7/2001 | Holderer | G02B 7/023 359/819 |
| 6,445,516 B2 | 9/2002 | Osterried | |
| 6,560,045 B1 | 5/2003 | Schletterer | |
| 6,734,949 B2 | 5/2004 | Franken | |
| 2002/0008858 A1 | 1/2002 | Wagner et al. | |
| 2008/0198352 A1 | 8/2008 | Kugler et al. | |
| 2011/0096314 A1* | 4/2011 | Sato | G02B 7/026 355/67 |
| 2014/0092492 A1* | 4/2014 | Topliss | G02B 7/08 359/823 |

FOREIGN PATENT DOCUMENTS

| | | |
|---|---|---|
| DE | 198 07 094 A1 | 8/1999 |
| DE | 198 25 716 A1 | 12/1999 |
| DE | 100 30 005 A1 | 12/2001 |

(Continued)

*Primary Examiner* — Mahidere Sahle
(74) *Attorney, Agent, or Firm* — Duane Morris LLP

(57) ABSTRACT

A monolithic lens mount is formed by an annular body which is divided through material recesses into an outer mount ring, an inner mount ring and three connection structures which are arranged so as to be offset by 120° relative to one another. The connection structures in each instance form a chain of at least three, preferably five, connection webs which transition into one another and which are constructed as radial connection webs and axial connection webs. The axial flexural stiffness and radial flexural stiffness and the torsional stiffness of the connection structures can be determined via the dimensioning of the radial connection webs and axial connection webs.

8 Claims, 5 Drawing Sheets

(56) References Cited

FOREIGN PATENT DOCUMENTS

| | | |
|---|---|---|
| DE | 10 2004 025 832 A1 | 12/2005 |
| EP | 1 094 348 B1 | 4/2005 |
| EP | 1 310 829 B1 | 5/2007 |

\* cited by examiner

MONOLITHIC LENS MOUNT

RELATED APPLICATIONS

The present application claims priority benefit of German Application No. DE 10 2015 115 929.5 filed on Sep. 21, 2015, the contents of which is incorporated by reference in its entirety.

FIELD OF THE INVENTION

Lens mounts are basically used for mechanically holding in a precise manner individual optical lenses or a plurality of lenses which are bonded to one another, also called cemented groups (hereinafter referred to only as lens), in exact mounted and/or adjusted positions within a lens system, i.e., with a determined spacing and orientation with respect to one another. Beyond this, it is important for lens systems with high requirements for imaging quality, particularly characterized by very low wavefront deformation and depolarization, that the lenses are mounted so as to be stable with respect to environment and, as far as possible, so as to be deformation-free and stress-free and that the mounted lens has a high natural frequency.

There are many different reasons for stresses occurring in a lens mount and, accordingly, for forces acting on the mounted lens.

BACKGROUND OF THE INVENTION

The three causes mentioned hereinafter are the main reasons which, individually or simultaneously, can cause stresses in the lens mount or between the lens mount and the lens.

One reason has to do with thermal stresses brought about by the different expansion coefficients of the material of the mount and of the optical element. They arise as a result of the fluctuation of the ambient temperature or particularly when the lens is heated when impinged by radiation. In the case of radially mounted lenses, the occurring thermal stresses act on the lens substantially through the introduction of radial forces into the lens.

A further reason for stresses may be the actuation of adjusting units by means of which, when a lens mount is divided into an inner mount ring and an outer mount ring, the inner mount ring in which the lens is held is adjusted relative to the outer mount ring. In this case too, forces acting substantially radially (hereinafter radial forces), or at least forces acting in a radial plane, are introduced into the lens. Whereas the thermally induced forces act symmetrically with respect to the axis of symmetry of the lens mount, the forces caused by the actuation of the adjusting units act point-by-point and asymmetrically.

A third reason resides in the connection of individual lens mounts to one another. A connection of this kind can be produced, e.g., in that lens mounts having the same outer diameter are inserted successively into an objective tube and fixed by means of a front-mount screw ring. A connection of this kind can also be produced in that the lens mounts are connected to one another, e.g., via screws. Owing to the high retaining forces, even deviations in flatness in the micrometer range lead to significant deformations in the lens mounts which, if transmitted to the lens in their entirety, lead to a certain degree of deformation or to the introduction of stresses into the lens which impermissibly impairs the imaging quality of the lens.

Regardless of the way in which the lens mounts are connected to one another, end faces of two adjacently arranged lens mounts come in contact with one another directly or via adjusting rings. Any unevenness in the end faces of the lens mounts and/or adjusting rings, if used, leads in principle to a torsion of the lens mounts and, therefore, to radially and axially acting forces operating on the lens. This torsion can also be caused by differing tightening torques at the screws in case of a connection by screws.

Diverse measures are taken in the prior art to prevent as far as possible the different stresses mentioned above from being transmitted to the lens held in the lens mount. These measures may consist in the selection of material, dimensioning and/or structural design of the lens mount.

In terms of construction, the simplest way to at least reduce a deformation of the lens would be to construct the inner mount ring of a mount divided into an outer mount ring and inner mount ring to be so sturdy that there could be no substantial deformation of the contact surfaces via which the lens mount communicates with the lens. However, this conflicts with the demand for a small installation space, an economical use of material and a lightweight construction and is technologically impossible for very demanding requirements.

It is more common to design the connection structures via which the outer mount ring and inner mount ring are connected to one another specifically so as to prevent forces or moments acting on the outer mount ring from being transmitted to the inner mount ring.

It is also known to design a mount ring which directly holds the lens and which can also be an inner mount ring specifically to absorb forces transmitted to it and not to transmit these forces to the lens. To this end, in a lens mount known, e.g., from EP 1 094 348 B1, elastic segments are formed at the lens mount which extend radially into an annular groove formed at the lens.

The three fundamentally different measures enumerated above, namely, a sturdy construction for preventing deformations in the areas of contact with the lens, the absorption of forces through connection structures, and the absorption of forces through the mount ring directly holding the lens, can be taken individually or in combination in order to hold the lens in the lens mount so as to be decoupled from stresses.

Decoupled from stresses or decoupled from deformation within the meaning of the present description does not mean that stresses generated in an outer mount ring are actually not transmitted at all to the inner mount ring, but rather that they are transmitted at most insignificantly.

As has been explained, the above-mentioned causes for stresses generated in the outer mount ring are mainly active forces which, on the one hand, lead to a bending of the connection structures around an axis perpendicular to a radial axis or to an elongation of the imaginary radial axis extending through the respective connection structure, hereinafter connection axis. On the other hand, torsional moments acting around the connection axes cause torsion in the connection structures. With regard to all of the effects taking place, even those occurring in combination, the connection structures are acted upon by forces which are transmitted via the connection structures to varying degrees as a function of the tensile stiffness, flexural stiffness and torsional stiffness of the lens mount and, therefore, of the connection structures.

In this regard, tensile stiffness characterizes the stiffness along a radial axis, flexural stiffness characterizes the stiffness along an axis perpendicular to a radial axis, and torsional stiffness characterizes the stiffness around a radial axis.

A connection structure which connects the inner mount ring to the outer mount ring so as to be decoupled from stresses means a connection structure which transmits stresses introduced into the outer mount ring by anticipated forces or torsional moments to the inner mount ring at most to an inconsiderable degree.

A mount system known from U.S. Pat. No. 5,353,166 A comprises a plurality of optical rings which serve either as mount rings which hold lenses or other optical elements, as spacer rings or as adapter rings for adapting mount rings of different diameters. It has been determined that when the end faces of these optical rings are surface-treated small depressions form around the bore holes provided for screwing on the rings and, as a result of these depressions, the rings are deformed when screwed together. To prevent this deformation, it is suggested that the optical rings be reinforced around the bore holes in axial direction, i.e., the optical rings are made thicker and, therefore, sturdier, while the screws are countersunk. The increase in the minimum distance between adjacent lenses, the increased installation space in axial direction and the extra weight are disadvantageous. A torsion of the two connected optical rings owing to the tolerances of the end faces is not taken into account.

Laid Open Application DE 100 30 005 A1 suggests a lens mount by which an optical element is to be held so as to be decoupled from deformation. A lens mount of this kind comprises an outer ring which can be connected to other outer rings and an inner ring holding a lens. The outer ring and the inner ring communicate via a three-point bearing support. This three-point bearing support can be formed of three bearing members which are arranged in the outer mount and which are supported in or on bearing points of the inner mount. The three-point bearing support ensures a precisely defined attitude of the inner ring in the outer ring, and the transmission of forces and, therefore, of stresses from the outer ring to the inner ring and accordingly to the lens is ruled out. The disadvantages in a lens mount of this type are the comparatively high expenditure on manufacturing and assembly and the high loading of the comparatively small and sparse contact points during shock.

An assembly having a mount and an element held therein via a connection structure is described in DE 198 07 094 A1. The connection structure is configured such that uneven heating brought about by the irradiation of the optical element is at least partially homogenized by it.

The connection structures can be webs of materials having different thermal conductivity or webs of different cross section.

Patent publication EP 1 310 829 B1 discloses a lens mount in which a lens is held so as to be decoupled from deformations of the lens mount. The lens mount has the footprint of an equilateral triangle, three blocks being formed at the corners thereof. Each corner connects two plate-like outer stiffeners which form the sides of the three-cornered lens mount. The blocks can be connected in each instance to an actuator or portion thereof. There can be inner stiffeners between the outer stiffeners to stiffen the lens mount. Medially between every two blocks there are provided in the outer stiffeners round cutouts in which membrane-like parts are inserted. These parts may be sheet-like or can preferably resemble spoked wheels. The lens mount and the membrane-like parts can be made from the same material; however, they are preferably produced separately. The blocks are preferably also produced and installed separately. The lens abuts the three membrane-like parts and is accordingly held via the latter so as to be decoupled from the actual lens mount with respect to stresses. The principle drawback in this lens mount is the substantial radial installation space.

DE 10 2004 025 832 A1 discloses an optics module in which a plurality of mounts are held coaxial to the module axis of the optics module in an outer flange in each instance via three bipods. The three bipods are connected in each instance to the flange in a plane via a bending joint which is movable in the manner of a ball joint and in another plane to one of the mounts via two bending joints which are movable in the manner of a ball joint. With a degree of freedom in direction of the module axis, the mounts are not held in an overdetermined manner. In theory, forces acting on the flange are converted into an axial movement without these forces being transmitted to the mounts. In practice, however, a transmission of force to the mount cannot be sufficiently prevented by reason of the friction occurring in the movable bending joints or restoring forces occurring in case of a flexible construction.

DE 198 25 716 A1 describes an assembly which comprises an optical element and a mount and in which the optical element is coupled with an intermediate ring (inner mount ring) via a plurality of lugs, and the intermediate ring is connected to a mount (outer mount ring) via adjusting members.

A solution searched for in U.S. Pat. No. 5,488,514 A would allow a plurality of mount rings (lens mounts) to be connected to one another as stacks without mechanical stresses resulting from the interconnection of the mount rings to be transmitted to the mounted lenses. To this end, an annular body is divided by slits into an outer mount ring and an inner mount ring which are connected to one another monolithically via three elastic elements (connection structures). Each of the suggested connection structures forms a ring segment which is connected to the outer mount ring and inner mount ring. Each of the connection structures presents an individual spring element. The radial flexural stiffness and the torsional stiffness can be altered via only a few parameters and are determined as a function of design and dimensioning by the width of the ring segments in radial direction and by their length along the circumference. A high flexural stiffness and torsional stiffness can be expected particularly in the different variants of relaxation slits formed along the entire height as is shown.

U.S. Pat. No. 4,733,945 A discloses a precision lens mount with an outer mount ring at which connection structures are formed monolithically and with a free end at which an optical element is directly installed. The connection structures have axial and radial webs which pass one into the other. The length of the axial webs is greater than that of the radial webs.

It is the object of the invention to provide a lens mount with an outer mount ring and an inner mount ring which are connected via connection structures which are so configured that radial forces or torsional moments caused at the connection structures primarily through stresses introduced into the outer mount ring are not transmitted to the inner mount ring.

For a monolithic lens mount formed by an annular body which is divided through material recesses into an outer mount ring, an inner mount ring and three connection structures which are arranged so as to be offset by 120° relative to one another and via which the inner mount ring is connected to the outer mount ring, the above-stated object is met in that the connection structures are formed in each instance by a chain of at least three connection webs which are connected through transitions and which are constructed alternately as radial connection webs and axial connection webs, and the radial connection webs have a length in radial direction, and the axial connection webs have a length in axial direction, and the length of the axial connection webs is greater than the length of the radial connection webs.

The radial connection webs have a thickness in an axial direction and the axial connection webs advantageously have a thickness in a radial direction, and the thickness of the axial connection webs is less than the thickness of the radial connection webs so that the low flexural stiffness of the axial connection webs becomes even smaller in proportion to the flexural stiffness of the radial connection webs.

In an advantageous manner, the radial connection webs and the axial connection webs have the same width, which width is less than the thickness of the axial connection webs so that the connection structure has a low torsional stiffness.

It is advantageous to form bevels with a bevel length at the transitions between the connection webs so that the flexural stiffness of the transitions can be influenced via the dimensioning of the bevel length.

It is advantageous when the connection web connected to the inner mount ring and the connection web connected to the outer mount ring is a radial connection web in each instance.

The connection structures are preferably connected to the outer mount ring at the level of a zero line of the outer mount ring, or also additionally the connection structures are arranged with the inner mount ring at the level of a zero line of the inner mount ring.

BRIEF DESCRIPTION OF THE DRAWINGS

The invention will be described more fully in the following with reference to embodiment examples and drawings. The drawings show:

FIG. 1b is a sectional view of the lens mount according to FIG. 1a;

FIG. 2b is a sectional view of the lens mount according to FIG. 2a;

DETAILED DESCRIPTION OF THE DRAWINGS

Figure 1A:
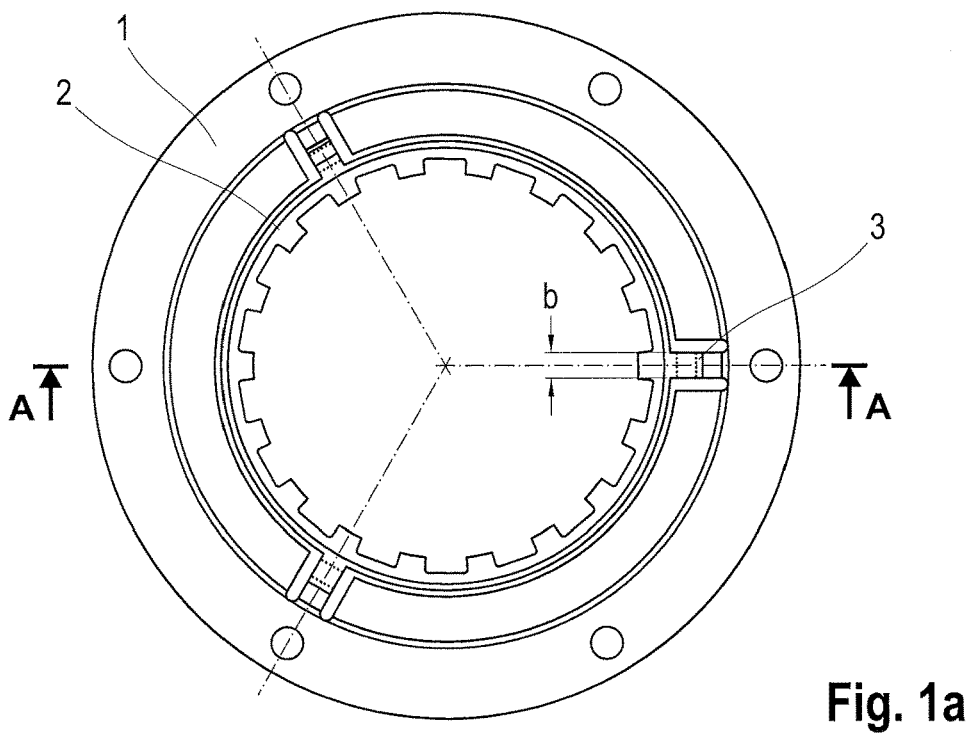
FIG. 1a is a top view of a lens mount with a first construction of connection structures.

All of the constructions of a lens mount according to the invention are formed by an annular body with an axis of symmetry 0, this annular body being divided through material recesses into an outer mount ring 1, an inner mount ring 2 and three connection structures 3 which are arranged so as to be offset by 120° relative to one another. The outer mount ring 1 has at least one end face via which it can be connected to an outer mount ring 1a of just this type in other lens mounts. A lens can be installed in the inner mount ring 2.

The material recesses dividing the outer mount ring 1 and the inner mount ring 2 are shown in the illustrations of the embodiment examples as annular cuts. However, they can be cut in any useful manner, e.g., in order to construct the inner mount ring 2 so as to be partially wider.

The inner mount ring 2 is also shown by way of example with flexible elements in which a lens can be received. However, the lens mount according to the invention is directed particularly to the construction of the connection structures 3 completely independently from the construction of the inner mount ring 2.

The connection structures 3 are a chain of at least three connection webs which pass into one another and which are arranged alternately radially and axially with respect to the axis of symmetry 0. The connection web passing into the inner mount ring 2 and the connection web passing into the outer mount ring 1 are advantageously arranged radially with respect to the axis of symmetry 0 of the annular body. The axis of symmetry 0 of the annular body also represents the axis of symmetry of the inner mount ring 2 and the axis of symmetry of the outer mount ring 1.

While not novel, it is important that the connection structures 3 are monolithic connections between the outer mount ring 1 and the inner mount ring 2. Accordingly, when the lens mount is produced by removing material, the connection webs are material webs which remain between material cutouts and which are connected to one another and to the outer mount ring 1 and inner mount ring 2, respectively, by flexure bearings. Friction which would possibly allow the connection webs to act rigidly until the friction is overcome is absent in the flexure bearings.

Regardless of the material selected for the annular body, a tensile stiffness, a flexural stiffness and a torsional stiffness are adjusted for the connection structures 3 via the quantity and dimensioning of the connection webs so as to be as low as possible so that stresses generated in the outer mount ring 1 are prevented from being transmitted to the inner mount ring 2. In other words, this means that the connection structures 3 are dimensioned in such a way that they are only as soft as necessary with respect to elongation, bending and torsion. The length $l_1$, $l_2$ of the connection webs equal to the distance between two adjacent flexural bearings, the thickness $d_1$, $d_2$ of the connection webs equal to the extension in radial direction and axial direction, and the width b of the connection webs equal to the extension along a circle around the axis of symmetry 0 are available for dimensioning the connection webs.

The connection webs extending in radial direction—radial connection webs 3.1—act like leaf springs in axial direction and the connection webs extending in axial direction—axial connection webs 3.2—act like leaf springs in radial direction. They are preferably identical in width b and can be freely dimensioned with respect to thickness $d_1$, $d_2$ and particularly with respect to their length $l_1$, $l_2$, so that the flexural stiffness in radial direction and axial direction and the torsional stiffness can be influenced.

The radial connection webs 3.1 have the shortest possible length $l_1$ and preferably a comparatively greater thickness $d_1$ so that the connection structure 3 has the greatest possible flexural stiffness in axial direction. For the lowest possible flexural stiffness in radial direction, the length $l_2$ of the axial connection webs 3.2 is as long as possible and their thickness $d_2$ is preferably comparatively smaller.

The connection structure 3 with reduced width b has an increasingly lower torsional stiffness.

Figure 3:
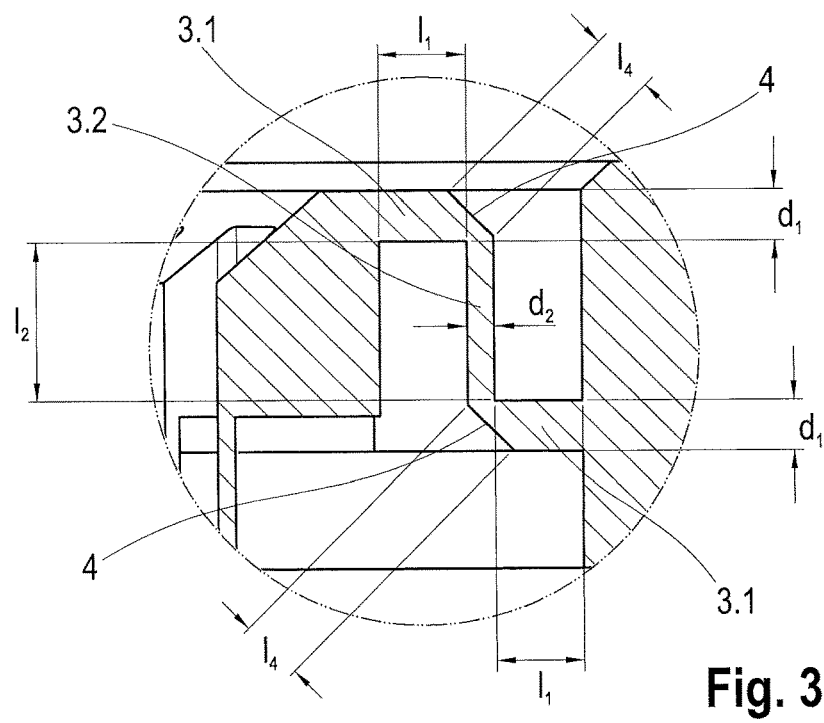
FIG. 3 is a detailed view of a third construction of a connection structure.

The flexure bearings formed by the transitions of the connection webs 3.1, 3.2 one into the other and the transitions of the connection structures 3 into the inner mount ring 2 and outer mount ring 1, respectively, may be weakened relative to the thickness $d_1$, $d_2$ of the relevant connection webs 3.1, 3.2 by a bevel 4 (see FIG. 3). Accordingly, the bevel length $l_4$ is another parameter in addition to the lengths $l_1$, $l_2$, thicknesses $d_1$, $d_2$ and width b of the connection webs 3.1, 3.2 for influencing the flexural stiffness and the torsional stiffness.

It is also key that the axial connection webs 3.2 are elastically deformable in radial direction, i.e., have a low flexural stiffness in radial direction, so that they can absorb reaction forces arising from the bending of the flexural bearings. If the radial and axial connection webs 3.1, 3.2 were stiff in radial direction, the reaction force would be transmitted to the flexural bearing connected to the inner mount ring 2 and would again cause a reaction force therein which would lead to the deformation of the inner mount ring 2.

Conflicting with the requirement for increasing the radial dimension of the lens mount as little as possible through the shape of the connection structures 3 is the fact that a short length $l_1$ of the radial connection webs 3.1 leads to a high axial flexural stiffness and a long length $l_2$ of the axial connections webs 3.2 leads to a low radial flexural stiffness. The ratio of radial flexural stiffness to axial flexural stiffness in the connection structures 3 can be adjusted via the length ratio.

The radial flexural stiffness and axial flexural stiffness are also determined by the thicknesses $d_1$, $d_2$ of the connection webs 3.1, 3.2. Therefore, it is advantageous that the thickness $d_2$ of the axial connection webs 3.2 selected is less than the thickness $d_1$ of the radial connection webs 3.1.

Figure 1B:
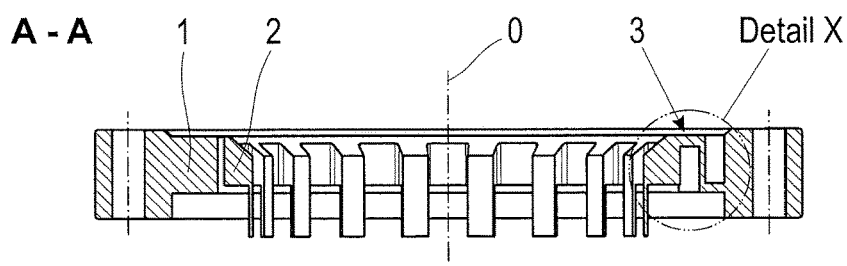
Figure 1C:
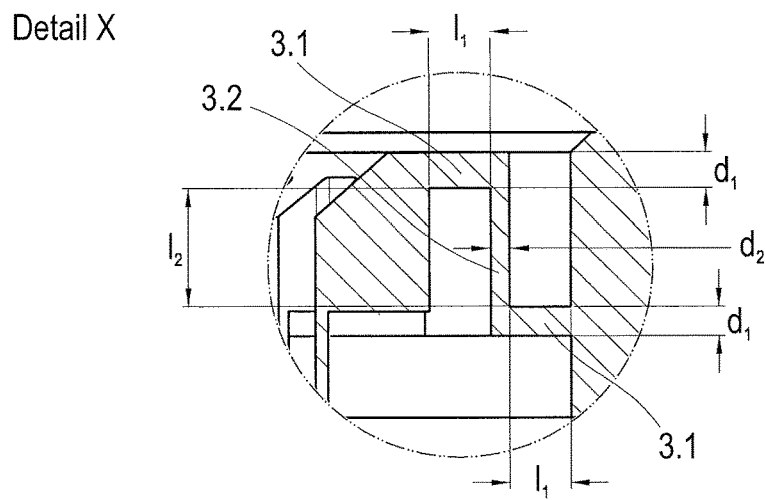
FIG. 1c is a detailed view of one of the connection structures of the lens mount according to FIG. 1b.
Figure 5:
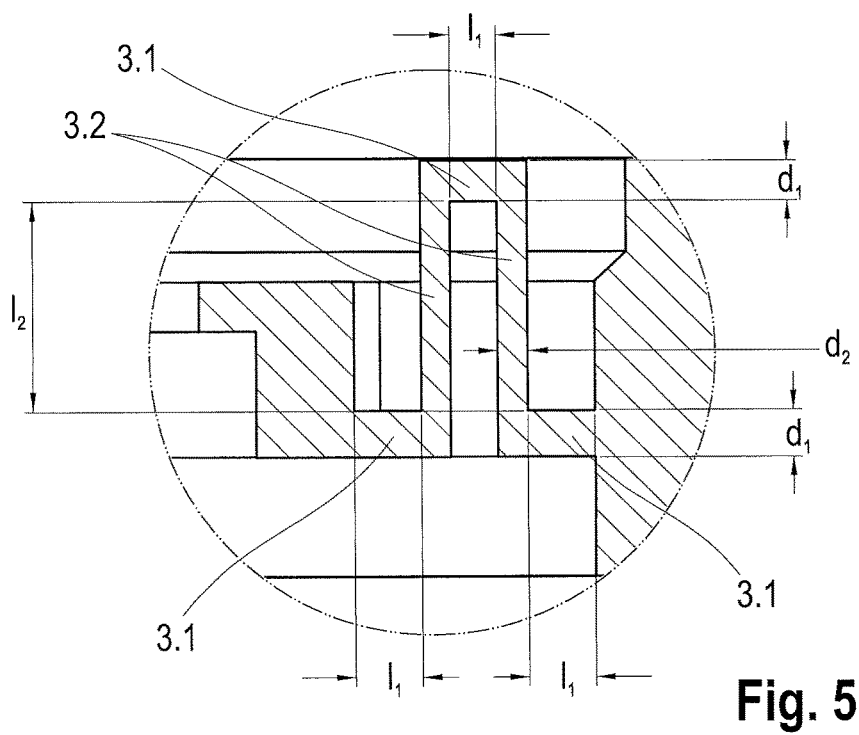
FIG. 5 is a detailed view of a fifth construction of a connection structure.
Figure 6:
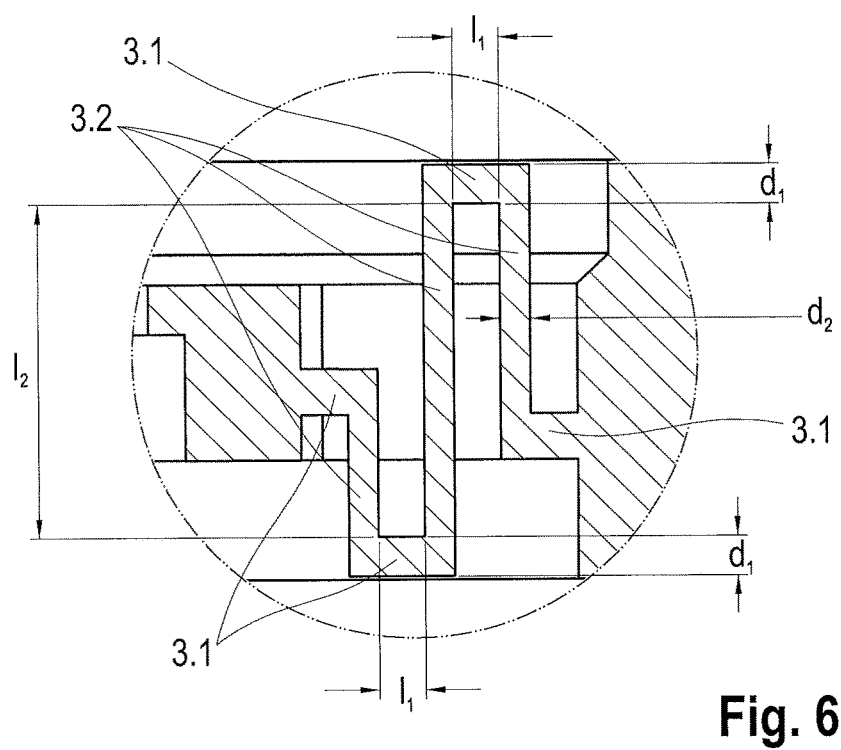
FIG. 6 is a detailed view of a sixth construction of a connection structure.
Figure 7:
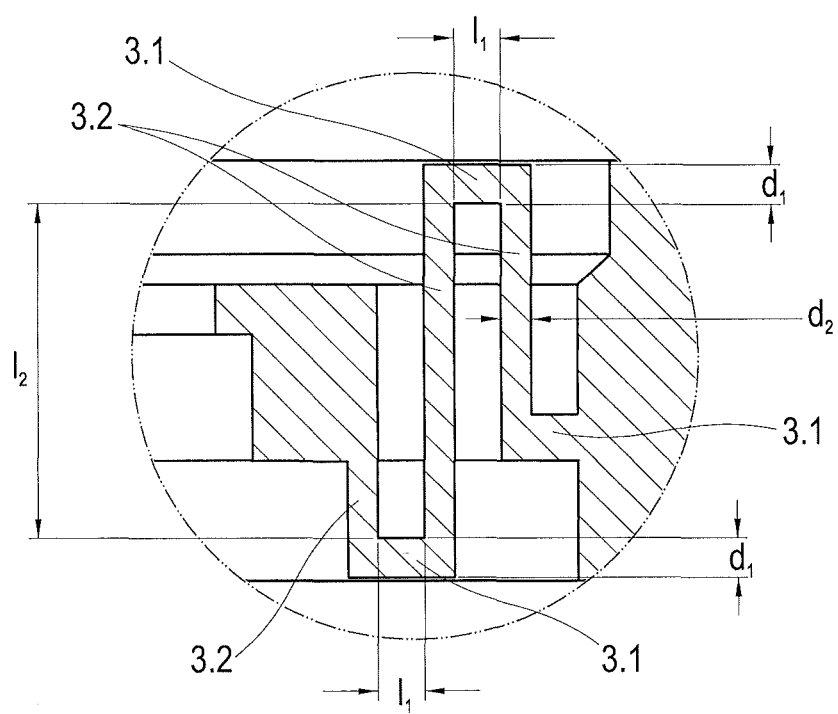
FIG. 7 is a detailed view of a seventh construction of a connection structure.

For a connection structure 3 with three connection webs 3.1, 3.2, as is shown in FIGS. 1a, 1b, and 1c, requiring an installation space which is comparatively as small as possible, thicknesses $d_1$, $d_2$, width b and lengths $l_1$, $l_2$ of connection webs 3.1, 3.2 are selected such that the connection structure 3 is sufficiently radially soft, axially stiff, and torsionally soft. In particular, as is shown in FIGS. 5, 6 and 7, the entire thickness of the annular body can be utilized for the length $l_2$ of the axial connection webs 3.2. Further, FIG. 7 shows an embodiment example for the connection structure 3 in which this connection structure 3 transitions into inner mount ring 2 via an axial connection web 3.2. Likewise, the transition of connection structure 3 into outer mount ring 1 can be formed via an axial connection web 3.2, although this is not advantageous.

Figure 2A:
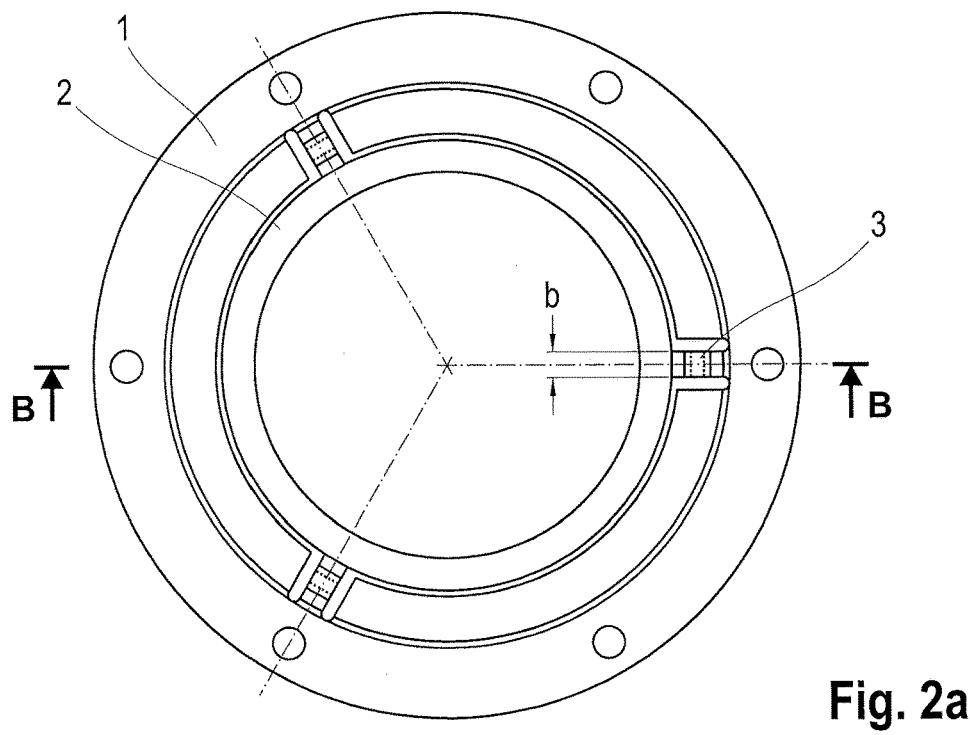
FIG. 2a is a sectional view of the lens mount with a second construction of connection structures.
Figure 2B:
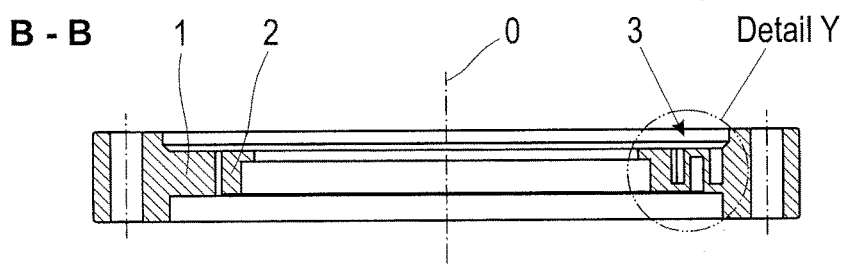
Figure 2C:
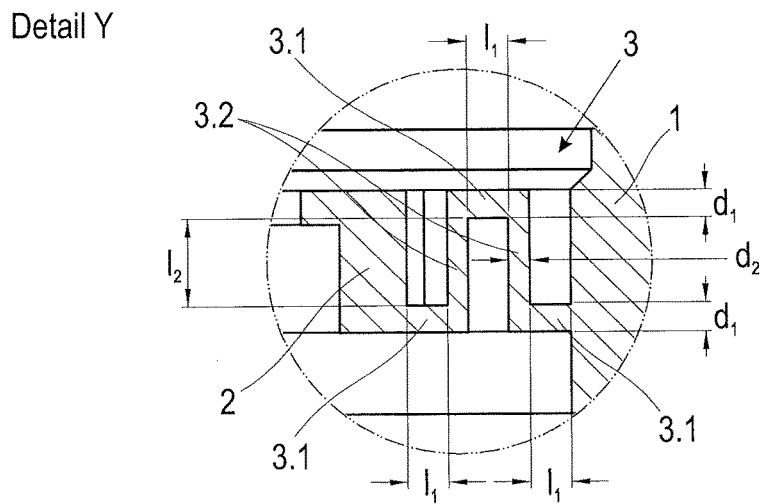
FIG. 2c is a detailed view of one of the connection structures of the lens mount according to FIG. 2b.

If the minimum dimension for the thicknesses $d_1$, $d_2$, width b and lengths $l_1$, $l_2$ of connection webs 3.1, 3.2 dictated by design and stability is not possible, the connection structure 3 is formed with five connection webs 3.1, 3.2 as is shown in FIGS. 2a, 2b and 2c or with a greater odd number of connection webs 3.1, 3.2 as is shown, for example, in FIG. 6.

The forces and moments introduced into the outer mount ring 1 lead primarily to a bending and rotation of the flexural bearing connected to the outer mount ring 1 and, in the adjoining radial connection web 3.1, cause reaction forces and reaction moments which, depending on flexural stiffness and torsional stiffness, are to a greater or lesser extent partially absorbed through deformation of the axial connection web 3.2 and partially transmitted to the next flexural bearing from which they are again partially absorbed and partially transmitted. Since the connection webs 3.1, 3.2 always have a minimum flexural stiffness and minimum torsional stiffness, the reaction forces cannot be completely absorbed through one connection web 3.1, 3.2 alone, but only increasingly via the chain of connection webs 3.1, 3.2.

Preferably, the transitions of the connection structures 3 to the outer mount ring 1 are located at the level of the zero line, as it is called, of the outer mount ring 1 whose length does not change during the bending so that no tensile stresses or compressive stresses are generated along this zero line.

Accordingly, in an advantageous manner only a comparatively small bending around the zero line is introduced into the connection structures 3 compared to the arrangement of the transitions adjacent to the end faces of the outer mount ring 1.

For technical reasons, the transitions of the connection structures 3 to the inner mount ring 2 are preferably arranged in the plane defined by the zero lines of the outer mount ring 1.

However, they can also be arranged at any other height or, ideally, for technical reasons relating to stresses, at the height of the zero lines of the inner mount ring 2.

Figure 4:
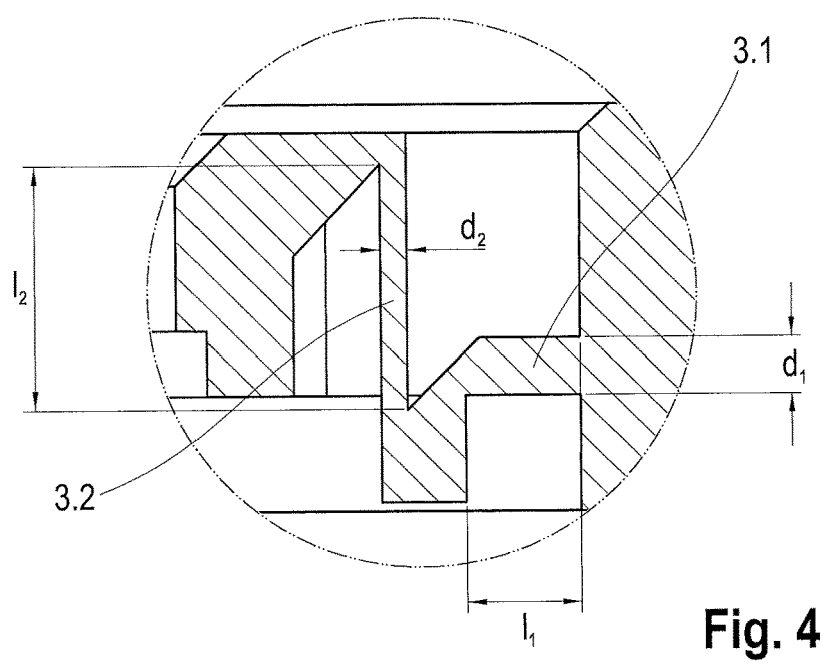
FIG. 4 is a detailed view of a fourth construction of a connection structure.

FIG. 3 shows a construction of a connection structure 3 which differs from that of the first embodiment example through bevels 4 at the transitions between the connection webs 3.1, 3.2. Therefore, the transitions which act as flexure bearings are softer. The bevels 4 have a bevel length $l_4$, and the flexural stiffness of the transitions can be influenced by the dimensioning of these bevels 4. A comparable effect is achieved when the transitions are weakened through notches as is shown in FIG. 4.

Regardless of the construction of the connection structures 3, the outer mount ring 1 and the inner mount ring 2 can be constructed in diverse ways as in the prior art. The construction of the outer mount ring 1 may differ particularly as a result of different constraints such as may occur when installing the lens mount in an optical system. The construction of the inner mount ring 2 may differ as a result of a radial or axial connection, bonding connection, or positive-engagement connection to the mounted lens. The inner mount ring 2 can also have constructional features, e.g., flexible segments known from EP 1 094 348 B1, cited above, which decouple the region of contact between lens and inner mount ring 2 from the circumferential surface of the inner mount ring 2 with respect to stresses.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE CHARACTERS 0 axis of symmetry
1 outer mount ring
2 inner mount ring
3 connection structure
3.1 radial connection web
3.2 axial connection web
4 bevel b width (of the connection webs 3.1, 3.2)
$d_1$ thickness (of the radial connection webs 3.1)
$d_2$ thickness (of the axial connection webs 3.2)
$l_1$ length (of the radial connection webs 3.1)
$l_2$ length (of the axial connection webs 3.2)
$l_4$ bevel length

What is claimed is:

1. A monolithic lens non-adjustable mount comprising an annular body with an axis of symmetry which is divided through material recesses into an outer mount ring, an inner mount ring and three connection structures each connection structure being arranged so as to be offset by 120° relative to one another, said inner mount ring being connected to the outer mount ring via said connection structures, said connection structures being formed in each instance by a chain of at least three connection webs, said chain being symmetrical to a radial axis, which connection webs are connected through transitions and which are constructed alternately as radial connection webs and axial connection webs, said radial connection webs having a length in a radial direction, and the axial connection webs having a length in an axial direction, the length of the axial connection webs being greater than the length of the radial connection webs, and said radial connection webs having a thickness in the axial direction and the axial connection webs having a thickness in the radial direction, wherein the thickness of the axial connection webs is less than the thickness of the radial connection webs.

2. The monolithic non-adjustable lens mount according to claim 1, wherein the radial connection webs and the axial connection webs have a same width which is less than the thickness of the axial connection webs.

3. The monolithic non-adjustable lens mount according to claim 1, further comprising bevels with a bevel length being formed at the transitions between the radial and axial connection webs so that the flexural stiffness of the transitions can be influenced via the dimensioning of the bevel length.

4. The monolithic non-adjustable lens mount according to claim 1, wherein the connection web connected to the inner mount ring and to the outer mount ring is one of the radial connection webs in each instance.

5. The monolithic non-adjustable lens mount according to claim 2, wherein the connection web connected to the inner mount ring and to the outer mount ring is one of the radial connection webs in each instance.

6. The monolithic non-adjustable lens mount according to claim 1, wherein the connection structures are connected to the outer mount ring at the level of a zero line of the outer mount ring.

7. The monolithic non-adjustable lens mount according to claim 2, wherein the connection structures are connected to the outer mount ring at the level of a zero line of the outer mount ring.

8. The monolithic non-adjustable lens mount according to claim 7, wherein the connection structures are connected to the inner mount ring at the level of a zero line of the inner mount ring.

* * * * *